United States Patent
Harada et al.

(10) Patent No.: US 7,522,358 B2
(45) Date of Patent: Apr. 21, 2009

(54) OPTICAL HEAD DEVICE AND MANUFACTURING METHOD THEREFOR

(75) Inventors: Masanobu Harada, Nagano (JP); Manabu Sakamoto, Nagano (JP)

(73) Assignee: Sankyo Seiki Mfg. Co., Ltd, Suwa-gun (JP)

( * ) Notice: Subject to any disclaimer, the term of this patent is extended or adjusted under 35 U.S.C. 154(b) by 946 days.

(21) Appl. No.: 10/921,046

(22) Filed: Aug. 18, 2004

(65) Prior Publication Data
US 2005/0068642 A1   Mar. 31, 2005

(30) Foreign Application Priority Data
Aug. 21, 2003   (JP) .............................. 2003-297772

(51) Int. Cl.
G02B 7/02 (2006.01)
G11B 7/00 (2006.01)
G11B 17/00 (2006.01)
G11B 17/03 (2006.01)

(52) U.S. Cl. ..................... 359/813; 359/814; 359/824; 369/44.15; 369/44.16; 369/44.22; 369/244.1; 720/683; 720/685

(58) Field of Classification Search .................. 359/811, 359/813, 814, 819, 824; 369/44.14–44.16, 369/44.22, 244; 720/680–685
See application file for complete search history.

(56) References Cited

U.S. PATENT DOCUMENTS

| 5,805,360 | A * | 9/1998 | Tomiyama et al. | 359/813 |
|---|---|---|---|---|
| 5,999,342 | A * | 12/1999 | Okada et al. | 359/813 |
| 6,404,728 | B1 * | 6/2002 | Shinozuka et al. | 720/681 |
| 6,781,926 | B2 * | 8/2004 | Ishizaki et al. | 369/13.13 |
| 7,016,125 | B2 * | 3/2006 | Nakamura et al. | 359/814 |
| 7,076,791 | B2 * | 7/2006 | Mori et al. | 720/683 |

* cited by examiner

Primary Examiner—Loha Ben
(74) Attorney, Agent, or Firm—Reed Smith LLP

(57) ABSTRACT

An optical head device includes a lens holder, a wire support body which supports the lens holder through a plurality of wires, and a plate-like member on which the wire support body is mounted. The plate-like member includes a bottom plate part on which the wire support body is mounted and a rising part raised from the bottom plate part so as to face with a gap to a side face of the wire support body. The wire support body is subjected to surface bonding to the rising part with a first adhesive which is disposed within the gap and mounted on the plate-like member.

18 Claims, 5 Drawing Sheets

[Fig.1]
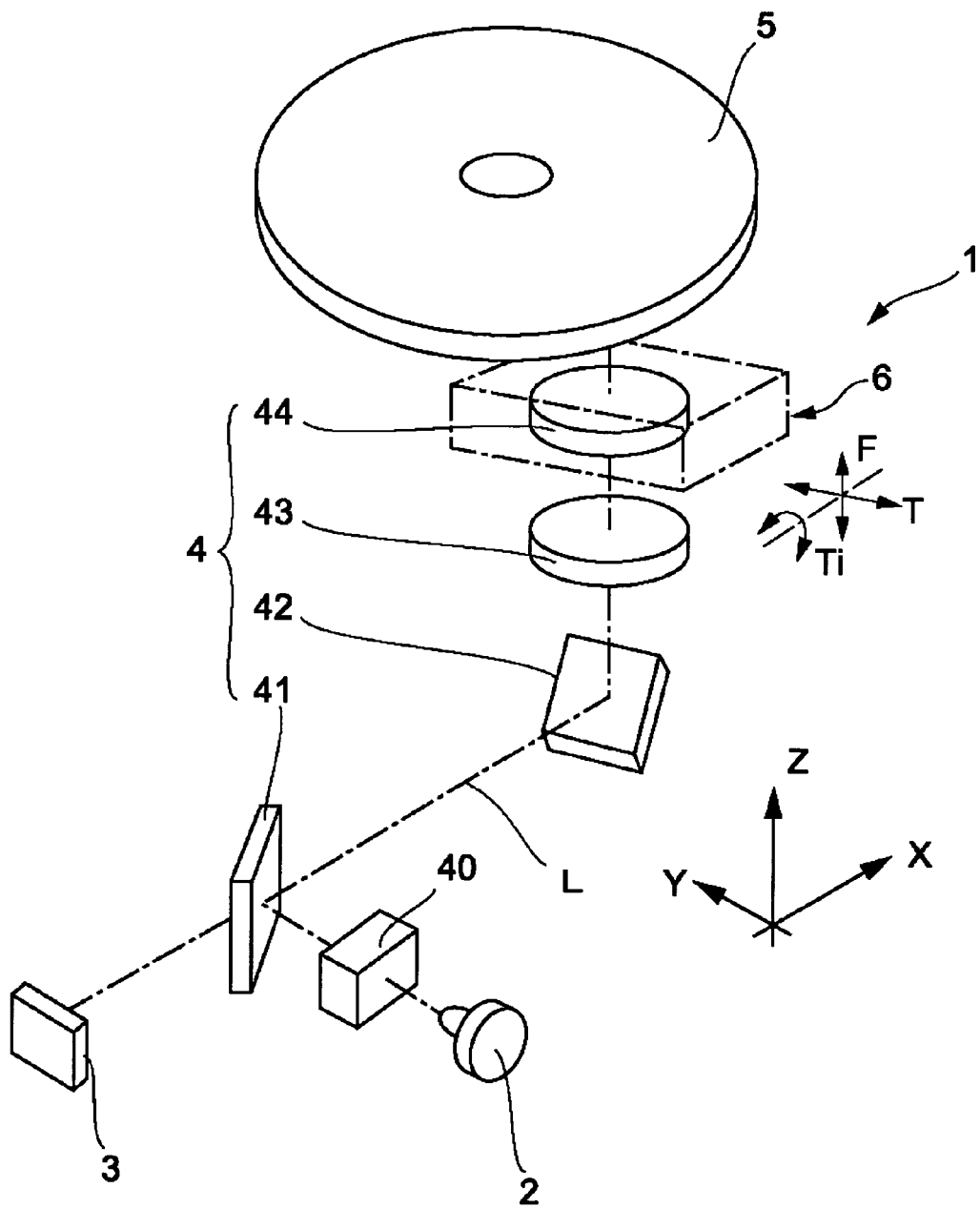

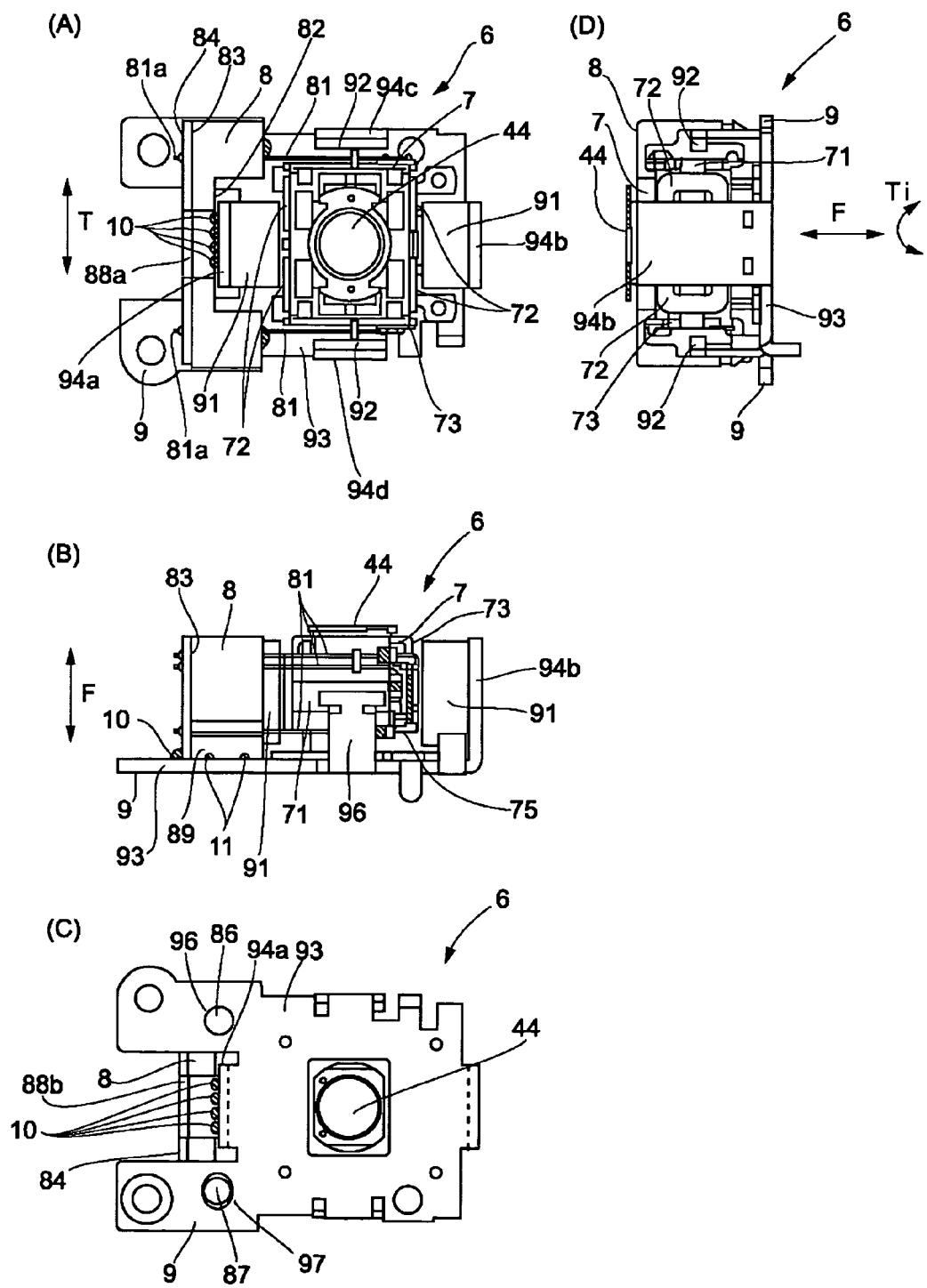
[Fig.2]

[Fig.3]
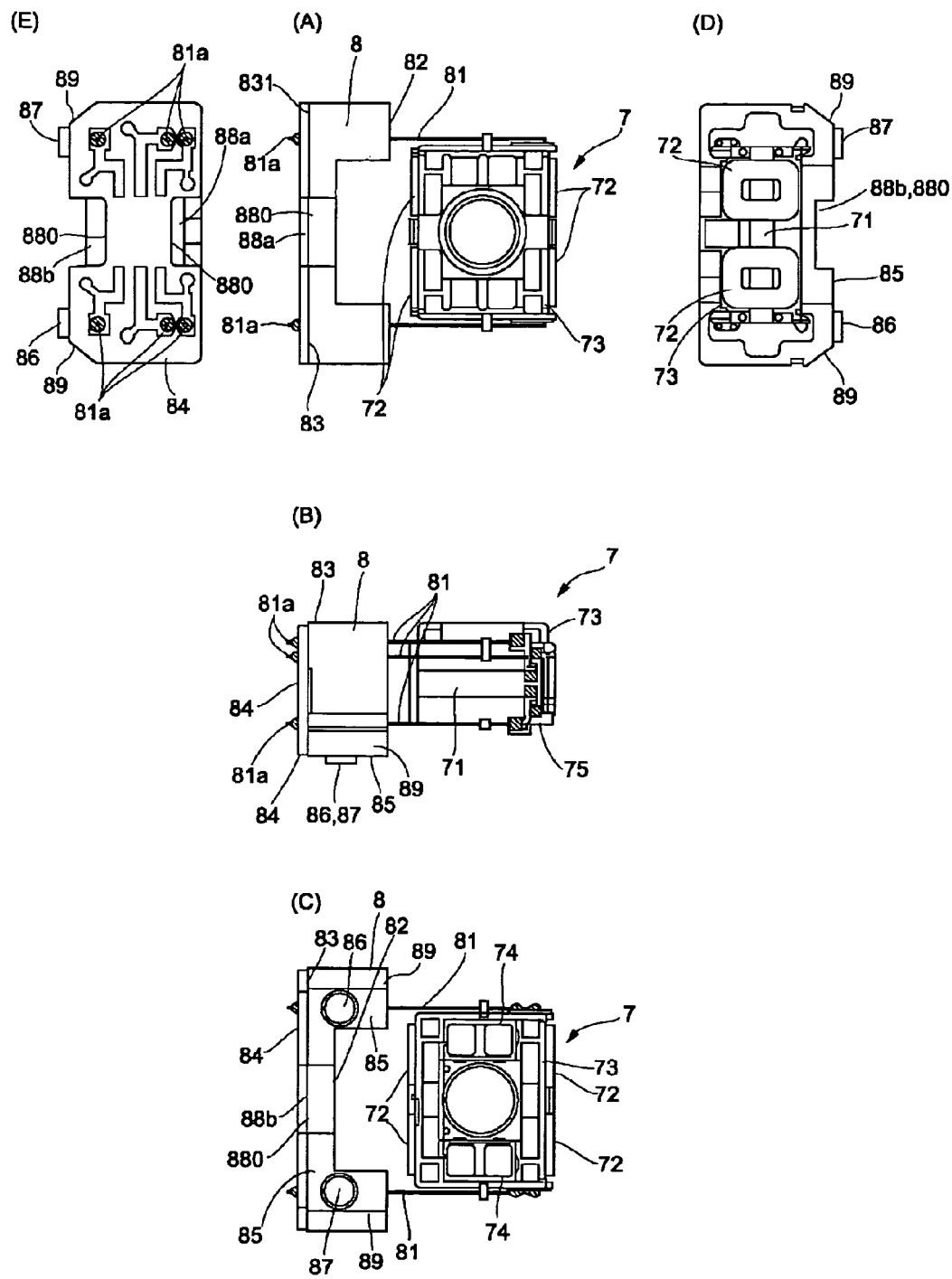

[Fig. 4]
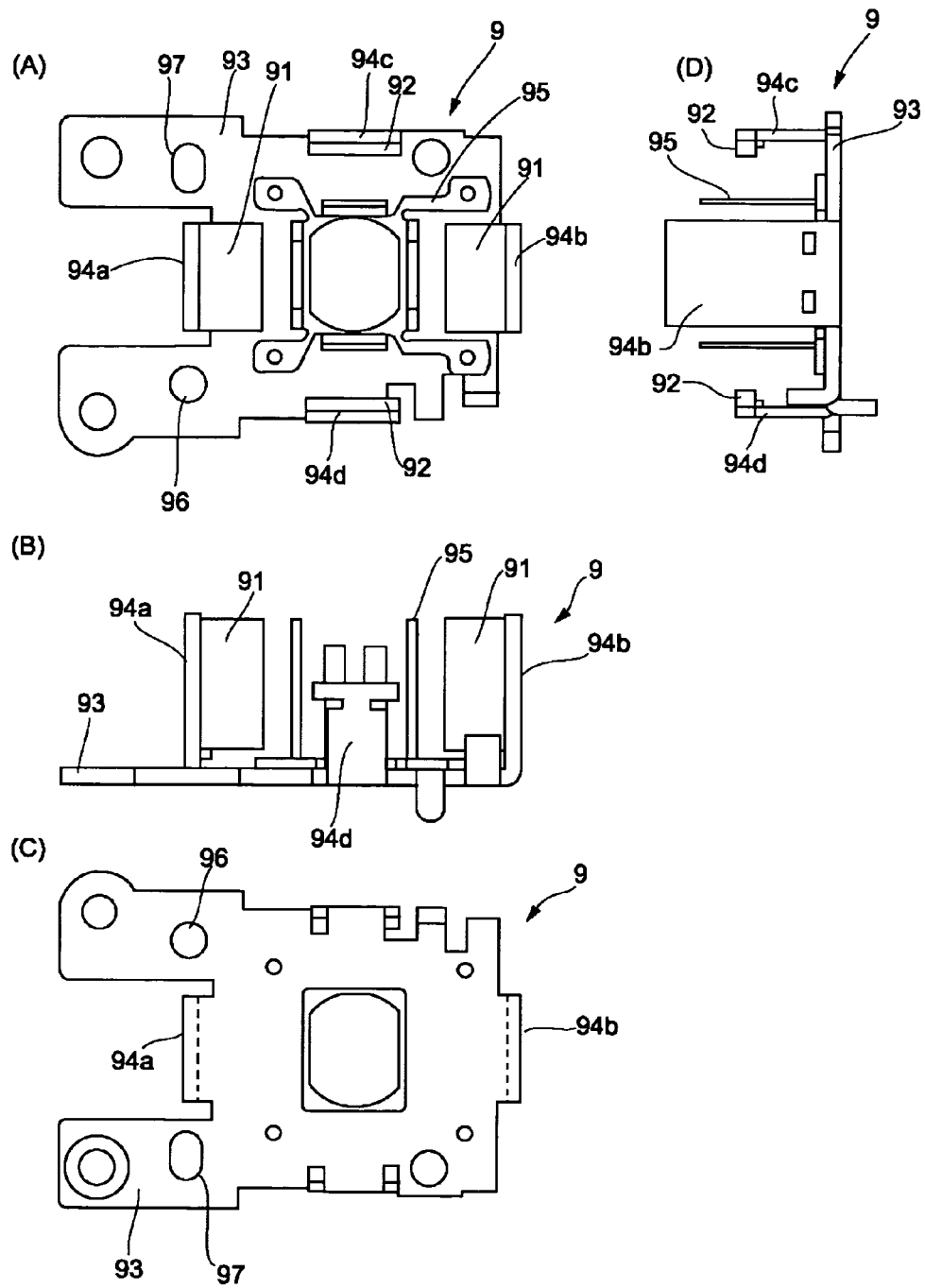

[Fig.5]
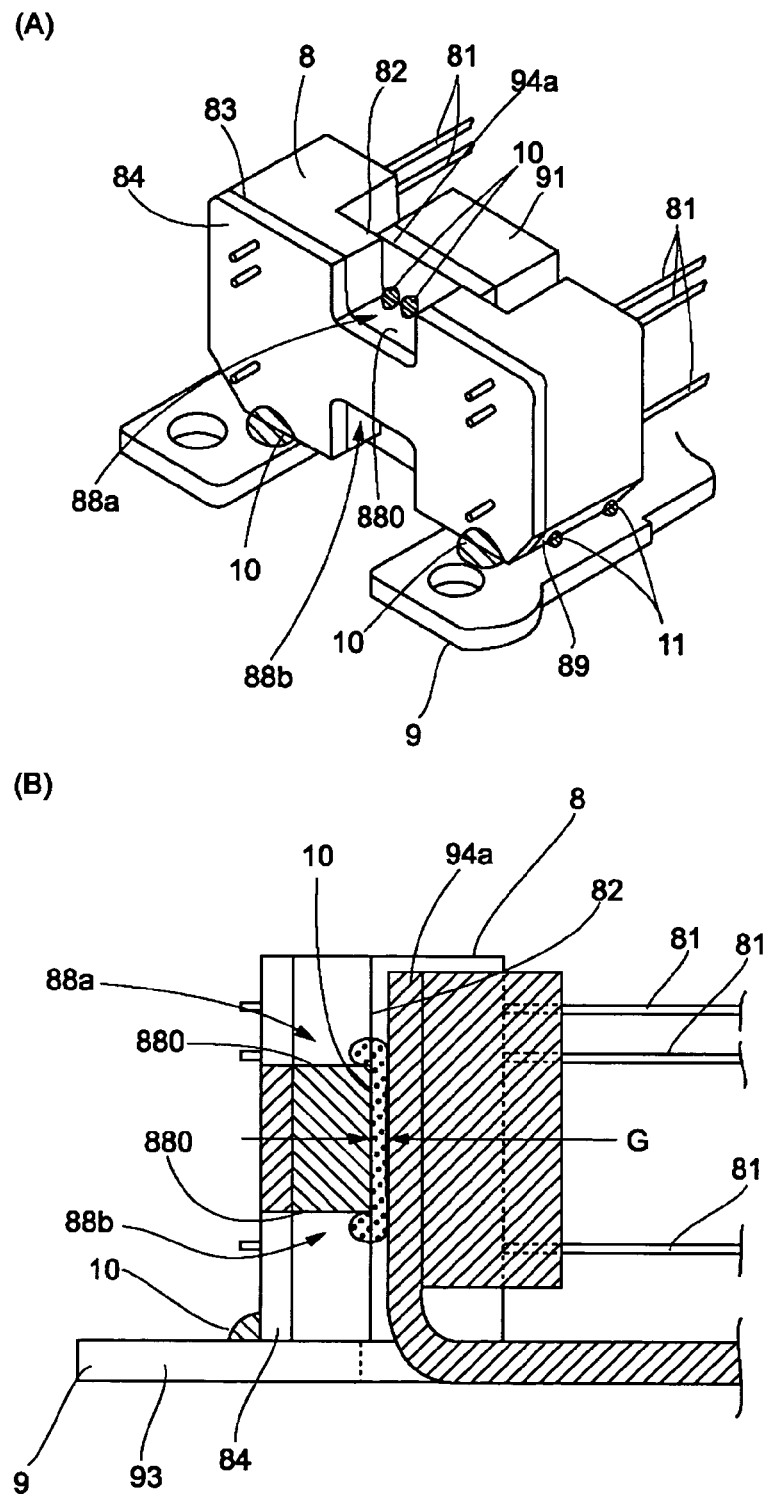

OPTICAL HEAD DEVICE AND MANUFACTURING METHOD THEREFOR

CROSS-REFERENCE TO RELATED APPLICATIONS

This application claims priority to Japanese Application No. 2003-297772 filed Aug. 21, 2003, which is incorporated herein by reference.

FIELD OF THE INVENTION

The present invention relates to an optical head device that is used to record into or reproduce from an optical recording disk such as a CD or a DVD and a manufacturing method for the optical head device. More specifically, the present invention relates to a fixing structure of a wire support body that supports a lens holder holding an objective lens by using wires in the optical head device.

BACKGROUND OF THE INVENTION

An optical head device used to record into or reproduce from an optical recording disk such as a CD or a DVD is provided with an objective lens drive mechanism which drives an objective lens for converging an emitted light beam from a light source on the optical recording disk in a tracking direction and in a focusing direction.

A wire suspension type of an objective lens driving mechanism has been known in the art, in which a lens holder is supported with a plurality of wires to be driven in a tracking direction and in a focusing direction.

In the wire suspension type of objective lens drive mechanism, the respective base end portions of a plurality of wires are supported by a wire support body which is constructed as a gel pot. The wire support body is mounted together with drive magnets on a yoke (plate-like member) which is formed of a magnetic plate. The drive magnets are fixed on the yoke with an adhesive and the wire support body is fixed with a screw.

However, when the wire support body is conventionally fixed to the yoke with a screw, a tapped hole is required for screwing in the wire support body and the yoke. Thus, a space is necessary for disposing them. Further, the number of component parts increases. On the contrary, when the number of screwed places is reduced, a coating of adhesive is required for reinforcing the fixed strength and thus time and labor are imposed in the fixing operation.

When the wire support body is fixed on the yoke with an adhesive only, a screw is not required. Accordingly, the number of component parts can be reduced and the fixing operation can also be smoothly executed. However, in the conventional structure or in the case that the optical head device is further made smaller, the places to be adhered and adhesive strength are not ensured. Further, when the under face of the wire support body is adhered and fixed on the yoke again after having been fixed with an adhesive, the adhesive residue left on the adhered face prevents the wire support body from being fixed in a proper state.

SUMMARY OF THE INVENTION

In view of the problems described above, it is an object and advantage of the present invention to provide an optical head device capable of surely fixing a wire support body, which supports a lens holder through wires, on a plate-like member even though a large space is not required for fixing, and to provide a manufacturing method for the optical head device.

In order to achieve the above object and advantage, according to an embodiment of the present invention, there is provided an optical head device including a lens holder for holding an objective lens for converging an emitted light beam from a light source on an optical recording disk, a wire support body for supporting the lens holder through a plurality of wires so as to be movable in at least a tracking direction, a drive magnet for making the lens holder move in at least the tracking direction by a magnetic force generated between a drive coil attached to the lens holder and the drive magnet, and a plate-like member on which the wire support body is mounted. The plate-like member includes a bottom plate part on which the wire support body is mounted and a rising part raised from the bottom plate part so as to face with a clearance to the side face of the wire support body, and the wire support body is subjected to surface bonding to the rising part with a first adhesive disposed within the clearance and thus the wire support body is mounted on the plate-like member.

In accordance with an embodiment of the present invention, the wire support body is preferably adhered and fixed on the bottom plate part with a second adhesive at a lower end portion of the side face of the wire support body that is opposite to a side face, which is adhesively bonded to the rising part. According to the reinforcement construction described above, the fall of the wire support body is prevented even when a force larger than the strength for preventing the fall of the rising part is applied to the wire support body. In this case, a wide space is not required even when the reinforcement is performed.

In accordance with an embodiment of the present invention, the adhesive is preferably a thermosetting adhesive such as epoxy-based adhesive. The thermosetting adhesive has the advantage that its adhesive strength is high.

In accordance with an embodiment of the present invention, the rising part is preferably formed to be raised between the lens holder and the wire support body. According to the construction described above, the drive magnet can be adhesively fixed on the opposite face of the rising part with respect to a face to which the wire support body is bonded.

In accordance with an embodiment of the present invention, the rising part is formed to be cut and raised between the portion where the wire support body is disposed and the portion where the lens holder is disposed on the plate-like member. According to the construction described above, the number of component parts can be reduced.

In accordance with an embodiment of the present invention, it is preferable that the wire support body is provided with a recessed part in at least one of the upper face and the under face of the wire support body, and the first adhesive is filled into the clearance from a space between the bottom part of the recessed part and the rising part.

In accordance with an embodiment of the present invention, it is preferable that a positioning protruded part is formed on the under face of the wire support body and a positioning hole into which the positioning protruded part is fitted is formed in the bottom plate part of the plate-like member. According to the construction described above, the wire support body can be disposed at a prescribed position on the plate-like member. Further, the positional variation of the wire support body due to the shrinkage at the time of the curing of adhesive can be suppressed.

In order to achieve the above object and advantage, according to an embodiment of the present invention, there is provided a manufacturing method for an optical head device. In the manufacturing method for an optical head device, it is preferable that the lower end portion of the wire support body and the base plate part are temporarily fixed with a third adhesive before the wire support body is adhesively fixed on the plate-like member. According to the construction described above, the temporary fixing can be performed without using a jig or the like.

In the optical head device in accordance with the embodiment of the present invention, the rising part is formed in the plate-like member, and the rising part and the side face of the wire support body are subjected to surface bonding. Therefore, the wire support body can be firmly fixed on the plate-like member while the adhered place does not require a wide space in a plan view. Further, since the side face of the wire support body is used for adhesion, the adhesive is not required to be coated on the under face of the wire support body. In an alternative embodiment, the adhesive may be coated on the under face of the wire support body. In the case that the adhesive is not coated on the under face of the wire support body, even when the wire support body is detached from the plate-like member, the adhesive does not leave a residue on the under face of the wire support body. Thus, after simple cleaning, the wire support body can be fixed in a proper state even when the wire support body is fixed again. Moreover, the positional variation of the wire support body due to the shrinkage at the time of curing of the adhesive can be suppressed in comparison with the structure in which the under face of the wire support body is adhered on the plate-like member.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 1 is a schematic construction showing an optical system of an optical head device to which the present invention is applied.

FIG. 2(A) is a plan view showing an objective lens drive mechanism in the optical head device shown in FIG. 1, FIG. 2(B) is its front view, FIG. 2(C) is its bottom view and FIG. 2(D) is its right side view.

FIG. 3(A) is a plan view showing a state in which a lens holder is supported by a wire support body in the objective lens drive mechanism shown in FIGS. 2(A) through 2(D), FIG. 3(B) is its front view, FIG. 3(C) is its bottom view, FIG. 3(D) is its right side view and FIG. 3(E) is its left side view.

FIG. 4(A) is a plan view showing a yoke of the objective lens drive mechanism shown in FIGS. 2(A) through 2(D), FIG. 4(B) is its front view, FIG. 4(C) is its bottom view, and FIG. 4(D) is its right side view.

FIG. 5(A) is a perspective view showing a fixed state of the wire support body and the yoke and FIG. 5(B) is its cross-sectional view.

DETAILED DESCRIPTION OF THE PREFERRED EMBODIMENTS

An example of an optical head device to which the present invention is applied will be described below with reference to the accompanying drawings.

FIG. 1 is a schematic construction showing the optical system of the optical head device to which the present invention is applied. As shown in FIG. 1, the optical head device 1 performs reproducing or recording information from or on an optical recording disk 5 (optical recording medium) such as a CD or a DVD. The optical head device 1 includes a laser light source 2, a light receiving element 3, and an optical system 4 for converging the laser beam emitted from the laser light source 2 on the optical recording disk 5 and for guiding a return light beam reflected by the optical recording disk 5 to the light receiving element 3.

The optical system 4 includes, when the coordinate axes orthogonal to each other are set to be X-axis, Y-axis, and Z-axis, a diffraction element 40 which diffracts the laser beam "L" emitted from the laser light source 2 in the Y-axis direction into three beams for tracking detection, a half mirror 41 which reflects the laser beam "L" separated into three beams by the diffraction element 40 in the X-axis direction, a total reflection mirror 42 for upwardly bending the laser beam from the half mirror 41 in the Z-axis direction, a collimator lens 43 for converting the laser beam "L" from the total reflection mirror 42 into a parallel light, and an objective lens 44 for converging the parallel light on the record surface of the optical recording disk 5. The objective lens 44 is servo-controlled by the objective lens drive mechanism 6 at a position in the tracking direction as shown by the arrow "T", in the focusing direction as shown by the arrow "F" and in the tilt direction as shown by the arrow "Ti".

FIG. 2(A) is a plan view showing the objective lens drive mechanism 6 in the optical head device 1 shown in FIG. 1, FIG. 2(B) is its front view, FIG. 2(C) is its bottom view and FIG. 2(D) is its right side view. FIG. 3(A) is a plan view showing a state in which a lens holder is supported by a wire support body in the objective lens drive mechanism shown in FIGS. 2(A) through 2(D), FIG. 3(B) is its front view, FIG. 3(C) is its bottom view, FIG. 3(D) is its right side view and FIG. 3(E) is its left side view. FIG. 4(A) is a plan view showing a yoke in the objective lens drive mechanism shown in FIGS. 2(A) through 2(D), FIG. 4(B) is its front view, FIG. 4(C) is its bottom view, and FIG. 4(D) is its right side view.

As shown in FIGS. 2(A) through 2(D), the objective lens drive mechanism 6 is an objective lens drive mechanism of a wire suspension type in which a lens holder 7 holding an objective lens 44 is supported with six wires 81. The objective lens drive mechanism 6 includes a lens holder 7, a wire support body 8 movably supporting the lens holder 7 with the six wires 81, which are disposed at three positions in the vertical direction on both right and left sides of the lens holder 7, in the tracking direction "T", in the focusing direction "F" and in the tilt direction "Ti", a yoke 9 for fixing and holding the wire support body 8, a focusing drive coil 71, tracking drive coils 72 and tilt drive coils (not shown), which are mounted on the lens holder 7 side, and drive magnets 91 for tracking and focusing and drive magnets 92 for tilt and focusing which are mounted on the yoke 9 and construct magnetic drive circuits for tracking, focusing and tilt together with the above-mentioned three drive coils.

As shown in FIGS. 2(A) through 2(D), and FIGS. 3(A) through 3(E), the lens holder 7 is provided with a body part 73 formed in a rectangular and tubular shape and the objective lens 44 is attached on the upper face of the body part 73. A molded product comprising of an optical plastics is used as the objective lens 44 and the objective lens 44 is attached at the last step when the objective lens drive mechanism 6 is assembled in order to prevent a scratch due to assembling operations and deformation due to the temperature variation at the time of assembling. In FIGS. 3(A) through 3(E), the lens holder 7 is shown in the state where the objective lens 44 is not attached.

The focusing drive coil 71 is wound around on the outer peripheral portion of the body part 73. The tracking drive coils 72 comprising of four flat coils that are mounted on the outer side of the focusing drive coil 71. Further, a pair of tilt drive coils 74 are mounted on the inner side of the body part 73. The focusing drive coil 71, the tracking drive coils 72 and the tilt drive coils 74 are supplied with electrical power through the six wires 81.

The wire 81 extends in the direction orthogonal to the optical axis of the objective lens 44, and its front end portion is fixed to the side face of the lens holder 7 and its base portion is supported by the wire support body 8.

The wire support body 8 supports the wires 81 in a state that the base portion of the wire 81 penetrates to a second side face 83 from a first side face 82, which is on the lens holder 7 side. A printed circuit board 84 is attached on the second side face 83 and the end portion 81a of the wire 81 is connected to the printed circuit board 84 with solder. Further, gel for absorbing vibration is enclosed in the inside of the wire support body 8 for absorbing the vibration of the wires 81.

In the embodiment of the present invention, positioning protruded parts 86, 87 are formed on the under face 85 of the wire support body 8.

In this embodiment of the present invention, the wire support body 8 is formed in a U-shape in the plan view and, in the description below, the entire face located on the lens holder 7 side is referred to as the first side face 82 without distinguishing between the inner side and the outer side of the U-shaped wire support body 8.

As shown in FIGS. 4(A) through 4(D), the yoke 9 is a plate-like member which is formed by press-working of a thin magnetic plate and is disposed so as to face to the under face 75 of the lens holder 7. The yoke 9 includes a bottom plate part 93 on which the wire support body 8 is mounted, outer yokes 94a, 94b, 94c, 94d which are cut and raised from the bottom plate part 93, and an inner yoke 95 fixed to the bottom plate part 93 with caulking. The drive magnets 91 for tracking and focusing are mounted on the outer yokes 94a, 94b and the drive magnets 92 for tilt and focusing are mounted on the outer yokes 94c, 94d.

The bottom plate part 93 is provided with a circular hole 96 into which the positioning protruded part 86 of the wire support body 8 is fitted and an elliptical hole 97 into which the positioning protruded part 87 is fitted as the positioning part for positioning the wire support body 8. Therefore, the wire support body 8 can be positioned with respect to the yoke 9 such that the positioning protruded part 86 fits into the circular hole 96 and the positioning protruded part 87 fits into the elliptical hole 97. In this state, the first side face 82 of the wire support body 8 faces to the outer yoke 94a with a gap space "G" of a prescribed clearance (see FIG. 5(B)).

FIG. 5(A) is a perspective view showing the fixed state of the wire support body 8 and the yoke 9 and FIG. 5(B) is its cross-sectional view.

In the embodiment of the present invention, the wire support body 8 and the yoke 9 are subjected to surface bonding with a thermosetting adhesive 10 (first adhesive) such as an epoxy adhesive which is filled in the clearance "G" formed between the surface of the first side face 82 of the wire support body 8 and the surface of the outer yoke 94a.

Recessed parts 88a, 88b are formed on the respective upper and under faces of the wire support body 8 and the thermosetting adhesive 10 is filled in the gap "G" from the space between the respective inner bottom faces 880 of the recessed parts 88a, 88b and the outer yoke 94a.

Further, the lower end part of the printed circuit board 84 constructing the second side face 83 of the wire support body 8 and the bottom plate part 93 of the yoke 9 are subjected to surface bonding with a thermosetting adhesive 10 (second adhesive) such as an epoxy adhesive.

The steps for mounting the wire support body 8 on the yoke 9 having the fixing structure described above will be described below. First, the wire support body 8 is disposed on the bottom plate part 93 of the yoke 9. At this time, the positioning protruded parts 86, 87 of the wire support body 8 are fitted into the circular hole 96 and the elliptical hole 97 for positioning the yoke 9 and thus the wire support body 8 is disposed at the predetermined position on the yoke 9.

Next, an ultraviolet curing adhesive 11 (third adhesive) is coated and cured so as to cover the lower end part 89 of the side face, which is perpendicular to the first side face 82 and the second side face 83 of the wire support body 8, and the bottom plate part 93 of the yoke 9 to temporarily fix the wire support body 8 on the yoke 9.

After the wire support body 8 is temporarily fixed, a thermosetting adhesive 10 (second adhesive) is coated in a spotted form between the inner bottom faces 880 of the recessed parts 88a, 88b of the wire support body 8 and the outer yoke 94a and the thermosetting adhesive 10 is flowed into the gap "G" between the first side face 82 of the wire support body 8 and the outer yoke 94a.

Also, the thermosetting adhesive 10 is coated so as to cover the lower end part of the printed circuit board 84, which constructs the second side face 83 of the wire support body 8, and the bottom plate part 93 of the yoke 9.

Next, the thermosetting adhesive 10 is thermally cured under the condition at the temperature of 90° C. for 30 minutes to adhesively fix the wire support body 8 on the yoke 9.

After then, the objective lens 44 is adhered and fixed to the lens holder 7.

As described above, in the optical head device 1 in accordance with the embodiment of the present invention, the wire support body 8 and the yoke 9 are subjected to surface bonding with a thermosetting adhesive 10, that is, the face of the wire support body 8 is adhered on the face of the outer yoke 94a, which is raised from the bottom plate part 93 of the yoke 9, with the thermosetting adhesive 10 in a face to face relation. Moreover, the adhesive strength of the thermosetting adhesive 10 is high. Accordingly, the wire support body 8 can be fixed on the yoke 9 firmly and such an adhered place is not required to occupy a wide space in the plan view. In addition, the first side face 82 of the wire support body 8 is used for adhesion and the adhesive is not applied to the under face of the wire support body 8. Consequently, even when the wire support body 8 is detached from the yoke 9, the adhesive is not remained on the under surface of the wire support body 8. Thus the wire support body 8 can be fixed in a proper state even when the wire support body 8 is fixed again after simple cleaning. Moreover, the positional variation of the wire support body 8 due to the shrinkage at the time of curing of the adhesive can be suppressed in comparison with the structure in which the under face of the wire support body 8 is adhered on the face of the yoke 9.

In the embodiment of the present invention, the first side face 82 of the wire support body 8 is subjected to surface bonding with the outer yoke 94a of the yoke 9. Therefore, the adhesive strength between the wire support body 8 and the yoke 9 can be enhanced in comparison with the case that the under face of the wire support body 8 is adhered on the yoke 9. Further, the thermosetting adhesive 10 is not coated between the surface of the bottom plate part 93 of the yoke 9 and the under face of the wire support body 8. Therefore, the positional variation of the wire support body 8 due to the shrinkage at the time of curing of the adhesive can be reduced.

Moreover, the wire support body 8 is bonded to the bottom plate part 93 of the yoke 9 with the thermosetting adhesive 10 at the lower end portion on the second side face 83 side which is opposite to the first side face 82. Therefore, even when a force, which is larger than the strength for preventing the fall of the outer yoke 94a, is applied thereto, the fall of the wire support body 8 can be prevented.

Moreover, in the embodiment of the present invention, the rising part for performing the surface bonding with the first side face 82 of the wire support body 8 is formed by cutting and bending upward as the outer yoke 94a between the lens holder 7 and the wire support body 8. Accordingly, since the both faces of the outer yoke 94a can be utilized, the simplification of structure and the reduction of the number of component parts can be attained.

Further, since the wire support body 8 is temporarily fixed to the yoke 9 with the ultraviolet curing type adhesive 11 or the like, a jig for temporary fixing is not required to be attached to and detached from the wire support body 8 and the yoke 9 under the condition that they are positioned each other, and thus the thermosetting adhesive 10 can be coated. Therefore, the coating operation is simple.

As described above, in the optical head device of the present invention, the rising part is formed in the plate-like member, and the rising part and the side face of the wire support body are subjected to surface bonding. Therefore, the wire support body can be firmly fixed on the plate-like member while the adhered place does not require a wide space in the plan view. Further, since the side face of the wire support body is used for adhesion, the adhesive may not be required to be coated on the under face of the wire support body. In the case that the adhesive is not coated on the under face of the wire support body, even when the wire support body is detached from the plate-like member, the adhesive does not remain on the under face of the wire support body. Thus the wire support body can be fixed in a proper state even when the wire support body is fixed again after simple cleaning. Moreover, the positional variation of the wire support body due to the shrinkage at the time of curing of the adhesive can be suppressed in comparison with the structure in which the under face of the wire support body is adhered on the plate-like member.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical head device comprising:
   a lens holder which holds an objective lens for converging an emitted light beam from a light source on an optical recording disk;
   a wire support body which supports the lens holder through a plurality of wires so as to be movable at least in a tracking direction;
   a drive magnet which makes the lens holder move at least in the tracking direction by a magnetic force generated between a drive coil attached to the lens holder and the drive magnet; and
   a plate-like member on which the wire support body is mounted, the plate-like member comprising:
      a bottom plate part on which the wire support body is mounted; and
      a rising part raised from the bottom plate part so as to face with a gap to a side face of the wire support body,
   wherein the wire support body is subjected to surface bonding to the rising part with a first adhesive which is disposed within the gap and mounted on the plate-like member; and
   wherein the wire support body is adhered and fixed on the bottom plate part with a second adhesive at a lower end portion of a side face which is opposite to a side face which is adhesively bonded to the rising part.

2. The optical head device according to claim 1;
   wherein the adhesive is a thermosetting first adhesive.

3. The optical head device according to claim 1;
   wherein the rising part is formed to be raised between the lens holder and the wire support body, and the drive magnet is adhesively fixed on an opposite face of the rising part with respect to a face to which the wire support body is bonded.

4. The optical head device according to claim 1;
   wherein the adhesive is a thermosetting first adhesive; and
   wherein the rising part is formed to be raised between the lens holder and the wire support body, and the drive magnet is adhesively fixed on an opposite face of the rising part with respect to a face to which the wire support body is bonded.

5. An optical head device comprising:
   a lens holder which holds an objective lens for converging an emitted light beam from a light source on an optical recording disk;
   a wire support body which supports the lens holder through a plurality of wires so as to be movable at least in a tracking direction;
   a drive magnet which makes the lens holder move at least in the tracking direction by a magnetic force generated between a drive coil attached to the lens holder and the drive magnet; and
   a plate-like member on which the wire support body is mounted, the plate-like member comprising:
      a bottom plate part on which the wire support body is mounted; and
      a rising part raised from the bottom plate part so as to face with a gap to a side face of the wire support body,
   wherein the wire support body is subjected to surface bonding to the rising part with a first adhesive which is disposed within the gap and mounted on the plate-like member; and
   wherein the rising part is formed to be raised between the lens holder and the wire support body, and the drive magnet is adhesively fixed on an opposite face of the rising part with respect to a face to which the wire support body is bonded.

6. The optical head device according to claim 5,
   wherein the rising part is formed to be cut and raised between the portion where the wire support body is disposed and the portion where the lens holder is disposed in the plate-like member.

7. An optical head device comprising:
   a lens holder which holds an objective lens for converging an emitted light beam from a light source on an optical recording disk;
   a wire support body which supports the lens holder through a plurality of wires so as to be movable at least in a tracking direction;
   a drive magnet which makes the lens holder move at least in the tracking direction by a magnetic force generated between a drive coil attached to the lens holder and the drive magnet; and a plate-like member on which the wire support body is mounted, the plate-like member comprising;
   a bottom plate part on which the wire support body is mounted; and
   a rising part raised from the bottom plate part so as to face with a gap to a side face of the wire support body,
wherein the wire support body is subjected to surface bonding to the rising part with a first adhesive which is disposed within the gap and mounted on the plate-like member; and
wherein the wire support body is provided with recessed parts in an upper face and an under face of the wire support body, and the first adhesive is flowed into the gap from a space between a bottom part of at least one of the recessed parts in the upper face and the under face and the rising part.

8. An optical head device comprising:
a lens holder which holds an objective lens for converging an emitted light beam from a light source on an optical recording disk;
a wire support body which supports the lens holder through a plurality of wires so as to be movable at least in a tracking direction;
a drive magnet which makes the lens holder move at least in the tracking direction by a magnetic force generated between a drive coil attached to the lens holder and the drive magnet; and
a plate-like member on which the wire support body is mounted, the plate-like member comprising:
   a bottom plate part on which the wire support body is mounted; and
   a rising part raised from the bottom plate part so as to face with a gap to a side face of the wire support body,
wherein the wire support body is subjected to surface bonding to the rising part with a first adhesive which is disposed within the gap and mounted on the plate-like member; and
wherein a positioning protruded part is formed on an under face of the wire support body and a positioning hole into which the positioning protruded part is fitted is formed in the bottom plate part of the plate-like member.

9. A manufacturing method for an optical head device including a lens holder which holds an objective lens for converging an emitted light beam from a light source on an optical recording disk, a wire support body which supports the lens holder through a plurality of wires so as to be movable at least in a tracking direction, a drive magnet which makes the lens holder move at least in the tracking direction by a magnetic force generated between a drive coil attached to the lens holder and the drive magnet, and a plate-like member on which the wire support body is mounted, comprising:
   forming the plate-like member so as to include a bottom plate part on which the wire support body is mounted and a rising part raised from the bottom plate part capable of facing with a gap to a side face of the wire support body;
   temporarily fixing a lower end portion of the wire support body to the bottom plate part with an adhesive, and then mounting the wire support body on the plate-like member by means of that the wire support body is subjected to surface bonding to the rising part with another adhesive disposed within the gap.

10. The method according to claim 9;
wherein the adhesive which fixes the lower end portion of the wire support body to the bottom plate part is an ultraviolet curing type adhesive; and
wherein the another adhesive which bonds the wire support body to the rising part is a thermosetting adhesive.

11. An optical head device comprising:
a lens holder that holds an objective lens for converging an emitted light beam from a light source on an optical recording disk;
a wire support body that movably supports the lens holder through a plurality of wires at least in a tracking direction;
a drive magnet that makes the lens holder move at least in the tracking direction by a magnetic force generated between a drive coil attached to the lens holder and the drive magnet; and
a plate-like member having a bottom plate part on which the wire support body is mounted and a rising part raised from the bottom plate part that faces a side face of the wire support body with a gap therebetween,
wherein the wire support body is subjected to surface bonding to the rising part with a first adhesive which is disposed within the gap and mounted on the plate-like member; and
wherein the wire support body is adhered and fixed on the bottom plate part with a second adhesive at a lower end portion of a side face which is opposite to a side face which is adhesively bonded to the rising part.

12. Claim 11;
wherein the adhesive is a thermosetting first adhesive.

13. An optical head device comprising:
a lens holder that holds an objective lens for converging an emitted light beam from a light source on an optical recording disk;
a wire support body that movably supports the lens holder through a plurality of wires at least in a tracking direction;
a drive magnet that makes the lens holder move at least in the tracking direction by a magnetic force generated between a drive coil attached to the lens holder and the drive magnet; and
a plate-like member having a bottom plate part on which the wire support body is mounted and a rising part raised from the bottom plate part that faces a side face of the wire support body with a gap therebetween,
wherein the wire support body is subjected to surface bonding to the rising part with a first adhesive which is disposed within the gap and mounted on the plate-like member; and
wherein the rising part is formed to be raised between the lens holder and the wire support body, and the drive magnet is adhesively fixed on an opposite face of the rising part with respect to a face to which the wire support body is bonded.

14. The optical head device according to claim 13,
wherein the rising part is formed to be cut and raised between the portion where the wire support body is disposed and the portion where the lens holder is disposed in the plate-like member.

15. An optical head device comprising:
a lens holder that holds an objective lens for converging an emitted light beam from a light source on an optical recording disk;
a wire support body that movably supports the lens holder through a plurality of wires at least in a tracking direction;
a drive magnet that makes the lens holder move at least in the tracking direction by a magnetic force generated between a drive coil attached to the lens holder and the drive magnet; and a plate-like member having a bottom plate part on which the wire support body is mounted and a rising part raised from the bottom plate part that faces a side face of the wire support body with a gap therebetween, wherein the wire support body is subjected to surface bonding to the rising part with a first adhesive which is disposed within the gap and mounted on the plate-like member; and wherein the wire support body is provided with recessed parts in an upper face and an under face of the wire support body, and the first adhesive is flowed into the gap from a space between a bottom part of at least one of the recessed parts in the upper face and the under face and the rising part.

16. An optical head device comprising:

a lens holder that holds an objective lens for converging an emitted light beam from a light source on an optical recording disk;

a wire support body that movably supports the lens holder through a plurality of wires at least in a tracking direction;

a drive magnet that makes the lens holder move at least in the tracking direction by a magnetic force generated between a drive coil attached to the lens holder and the drive magnet; and a plate-like member having a bottom plate part on which the wire support body is mounted and a rising part raised from the bottom plate part that faces a side face of the wire support body with a gap therebetween, wherein the wire support body is subjected to surface bonding to the rising part with a first adhesive which is disposed within the gap and mounted on the plate-like member; and wherein a positioning protruded part is formed on an under face of the wire support body and a positioning hole into which the positioning protruded part is fitted is formed in the bottom plate part of the plate-like member.

17. A method for making an optical head device including a lens holder that holds an objective lens for converging an emitted light beam from a light source on an optical recording disk, a wire support body that movably supports the lens holder through a plurality of wires at least in a tracking direction, a drive magnet that makes the lens holder move at least in the tracking direction by a magnetic force generated between a drive coil attached to the lens holder and the drive magnet, and a plate-like member having a bottom plate part on which the wire support body is mounted and a rising part raised from the bottom plate part that faces a side face of the wire support body with a gap therebetween, comprising:

temporarily fixing a lower end portion of the wire support body to the bottom plate part with an adhesive, and then mounting the wire support body on the plate-like member by surface bonding the wire support body to the rising part of the plate-like member with another adhesive disposed within the gap.

18. The method according to claim 17;

wherein the adhesive which fixes the lower end portion of the wire support body to the bottom plate part is an ultraviolet curing type adhesive; and wherein the another adhesive which bonds the wire support body to the rising part is a thermosetting adhesive.

* * * * *